US009595726B2

(12) United States Patent
Chen et al.

(10) Patent No.: US 9,595,726 B2
(45) Date of Patent: Mar. 14, 2017

(54) FUEL REFORMING SYSTEM AND PROCESS

(71) Applicant: ADVANCED COOLING TECHNOLOGIES, INC., Lancaster, PA (US)

(72) Inventors: Chien-Hua Chen, Lititz, PA (US); Howard Pearlman, Haddon Township, NJ (US)

(73) Assignee: Advanced Cooling Technologies, Inc., Lancaster, PA (US)

( * ) Notice: Subject to any disclaimer, the term of this patent is extended or adjusted under 35 U.S.C. 154(b) by 511 days.

(21) Appl. No.: 14/148,971

(22) Filed: Jan. 7, 2014

(65) Prior Publication Data
US 2015/0191352 A1  Jul. 9, 2015

(51) Int. Cl.
*C01B 3/38* (2006.01)
*H01M 8/06* (2016.01)
*C01B 3/36* (2006.01)

(52) U.S. Cl.
CPC ............. *H01M 8/0618* (2013.01); *C01B 3/36* (2013.01); *C01B 2203/0255* (2013.01); *C01B 2203/0283* (2013.01); *C01B 2203/062* (2013.01); *C01B 2203/066* (2013.01); *C01B 2203/0883* (2013.01); *C01B 2203/1235* (2013.01); *C01B 2203/1241* (2013.01); *C01B 2203/1247* (2013.01)

(58) Field of Classification Search
USPC ........................................................ 252/373
See application file for complete search history.

(56) References Cited

U.S. PATENT DOCUMENTS

| | | | |
|---|---|---|---|
| 3,302,683 A | 2/1967 | Kemp | |
| 3,351,563 A * | 11/1967 | Negra | ........................ C01B 3/38 |
| | | | 252/373 |
| 3,397,028 A | 8/1968 | Brauer | |

(Continued)

FOREIGN PATENT DOCUMENTS

| | | |
|---|---|---|
| CA | 2436997 | 7/2010 |
| CN | 101589275 A | 11/2009 |

(Continued)

*Primary Examiner* — Melvin C Mayes
*Assistant Examiner* — Kenneth Vaden
(74) *Attorney, Agent, or Firm* — McNees Wallace & Nurick LLC

(57) ABSTRACT

Fuel reforming processes and systems are disclosed. The fuel reforming process includes providing a fuel reformer, the fuel reformer comprising a reaction zone configured for exothermic partial oxidation to generate reformates and a heat exchanger extending from the reaction zone, the heat exchanger configured to expel the reformates through a reformate path and receive fuel-rich reactants through a fuel path, generating the reformates by the exothermic partial oxidation of the fuel-rich reactants within the reaction zone, heating the fuel-rich reactants in reaction zone with the heat exchanger by heat from the reformates in the reformate path. The process is energetically self-sustained and operates without a catalyst. The fuel reforming system includes the fuel reformer with a spiral heat exchanger and a component capable of operation with the reformates and incompatible with combustion products, such as a fuel cell.

17 Claims, 3 Drawing Sheets

(56) References Cited

U.S. PATENT DOCUMENTS

| | | | | |
|---|---|---|---|---|
| 4,227,021 | A | * | 10/1980 | Grosskinsky ......... C07C 51/487 562/513 |
| 4,369,029 | A | | 1/1983 | Forster et al. |
| 5,188,740 | A | * | 2/1993 | Khan ...................... C02F 1/025 210/609 |
| 5,520,864 | A | * | 5/1996 | Frei ........................ F02M 69/06 261/88 |
| 5,529,484 | A | | 6/1996 | Moard et al. |
| 6,613,972 | B2 | | 9/2003 | Cohen et al. |
| 6,840,762 | B2 | | 1/2005 | Maruta et al. |
| 6,936,238 | B2 | | 8/2005 | Sennoun et al. |
| 6,951,456 | B2 | | 10/2005 | Cohen et al. |
| 7,135,154 | B2 | | 11/2006 | Deshpande |
| 7,247,402 | B2 | | 7/2007 | Haile et al. |
| 7,316,563 | B2 | | 1/2008 | Marshall |
| 7,625,414 | B2 | | 12/2009 | Nougier et al. |
| 8,323,363 | B2 | | 12/2012 | Bingue et al. |
| 2002/0020113 | A1 | | 2/2002 | Kennedy et al. |
| 2004/0123523 | A1 | | 7/2004 | Rong et al. |
| 2007/0131909 | A1 | * | 6/2007 | Rojey ...................... C10J 3/00 252/373 |
| 2008/0249196 | A1 | * | 10/2008 | Wentink .................. C01B 3/16 518/702 |
| 2009/0087801 | A1 | | 4/2009 | Schoegl et al. |
| 2009/0119991 | A1 | * | 5/2009 | Johnson ..................... C10J 3/66 48/78 |
| 2010/0175639 | A1 | | 7/2010 | Al-Dawood et al. |
| 2011/0120012 | A1 | * | 5/2011 | Balmas ...................... C10J 3/00 48/197 R |
| 2011/0168360 | A1 | * | 7/2011 | Chang ..................... F28F 3/048 165/104.31 |
| 2012/0095118 | A1 | * | 4/2012 | Bracht ...................... C01B 3/36 518/703 |
| 2013/0015405 | A1 | | 1/2013 | Quintero et al. |
| 2013/0105739 | A1 | | 5/2013 | Bingue et al. |

FOREIGN PATENT DOCUMENTS

| | | |
|---|---|---|
| DE | 19903168 A1 | 8/2000 |
| DE | 10345902 B4 | 5/2005 |
| DE | 102007025785 B4 | 2/2009 |
| EP | 1345679 B1 | 3/2013 |
| JP | 2007507686 | 11/2007 |
| JP | 2010513834 | 4/2010 |
| WO | 0247186 A2 | 6/2002 |
| WO | 2007121004 A2 | 10/2007 |
| WO | 2013008020 A1 | 1/2013 |

* cited by examiner

FUEL REFORMING SYSTEM AND PROCESS

FIELD OF THE INVENTION

The present invention is directed to fuel reforming processes and systems. More particularly, the present invention is directed to fuel reforming processes and systems receiving hydrocarbon-air mixtures in fuel-rich conditions.

BACKGROUND OF THE INVENTION

Electrical power generation devices using hydrocarbons such as natural gas, gasoline, diesel, military logistic fuels, and other similar materials as the energy storage medium have several advantages over batteries. Such advantages include, for example, higher energy density, easier transportation, operation with a variety of supply infrastructures, short recharge periods, and other benefits.

Some devices, including fuel cells, operate using syngas, a mixture of $H_2$ and CO. Syngas having $H_2$ and CO can be produced from hydrocarbons by using catalysts in fuel reformers. Using the catalysts permits a rapid reaction rate for fuel-rich reaction that has lower reaction temperature. For example, the catalysts lower the effective activation energy so that products are able to reach their chemical equilibrium state at reduced temperatures resulting in near-theoretical yields (maximum amounts attainable) of $H_2$ and CO in the syngas. However, sulfur compounds and/or higher hydrocarbons present in the energy storage medium can easily poison or deposit carbon (coking) on the catalyst, which degrades performance and shortens the useful life of the catalyst for reformer operations. Catalysts also suffer from other deactivation mechanisms such as sintering.

To address such drawbacks, expensive noble-metal-based catalysts, such as rhodium, have been used. In addition, sub-systems, for example, for pre-desulfurization and/or water management, and complicated control systems have been used. Such remedies are not well-suited for portable and/or small power scale applications where the system size, weight, and parasitic power consumption are important. In addition, such remedies are expensive.

In addition to using catalyst, syngas having $H_2$ and CO can also be generated in fuel-rich reaction at elevated temperature, for example, using pure oxygen instead of air as oxidizer to reduce the need for thermal diluents or using an external energy source (for example, plasma) to provide excess energy in the reactants and thus accelerate the reaction rate. However, such systems are very large, very complex, and very expensive.

A known combustor operates with a combustion zone configured for receiving fuel-lean energy storage media from a first spiraling path in a spiral heat exchanger to produce combustion products. The combustion products include $H_2O$ and $CO_2$, which are expelled through a second spiraling path and preheat the incoming reactants in the first spiraling path. The known combustor is able to create a higher temperature reaction zone using air as oxidizer without external energy input, but the combustion products are not capable of being used in systems and processes requiring a syngas with a higher concentration of $H_2$ and CO than the resulting effluent from combustion.

Fuel reforming processes and systems that produce one or more improvements would be desirable in the art.

BRIEF DESCRIPTION OF THE INVENTION

In an exemplary embodiment, a fuel reforming process includes providing a fuel reformer, the fuel reformer including a reaction zone configured for exothermic partial oxidation to generate reformates and a heat exchanger extending from the reaction zone, the heat exchanger configured to expel the reformates through a reformate path and receive fuel-rich reactants through a fuel path. The fuel reforming process also includes generating the reformates by the exothermic partial oxidation of the fuel-rich reactants within the reaction zone and heating the fuel-rich reactants with the heat exchanger by heat from the reformates in the reformate path. The process is energetically self-sustained and operates without a catalyst.

In another exemplary embodiment, a fuel reforming system includes a fuel reformer, the fuel reformer comprising a reaction zone configured for exothermic partial oxidation to generate reformates and a spiral heat exchanger extending from the reaction zone, the spiral heat exchanger configured to expel the reformates through a first spiraling path and receive fuel-rich reactants through a second spiraling path, and a fuel cell arranged and disposed to receive the reformates from the fuel reformer.

In another exemplary embodiment, a fuel reforming system includes a fuel reformer, the fuel reformer comprising a reaction zone configured for exothermic partial oxidation to generate reformates, and a spiral heat exchanger extending from the reaction zone, the spiral heat exchanger configured to expel the reformates through a first spiraling path and receive fuel-rich reactants through a second spiraling path, and a component capable of operation with the reformates and incompatible with combustion products.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are fuel reforming processes and systems. Embodiments of the present disclosure, for example, in comparison to similar processes and systems that do not include one or more of the features disclosed herein, permit higher energy density, permit easier transportation, permit intermittent or continuous operation utilizing existing supply infrastructures, increase yields of $H_2$ and CO in syngas without catalysts, reduce or eliminate coking and/or catalyst degradation, have a longer operational life, operate without noble-metal-based catalysts (such as rhodium), are less complicated, operate without sub-systems (for example, pre-desulfurization, water management, and/or complicated control sub-systems), are portable, are smaller, are energetically self-sufficient, operate without pure oxygen streams, operate with fuel-rich combustion products, permit lower pressure drops (thus requiring less pump power), other suitable distinctions, or a combination thereof.

Figure 1:
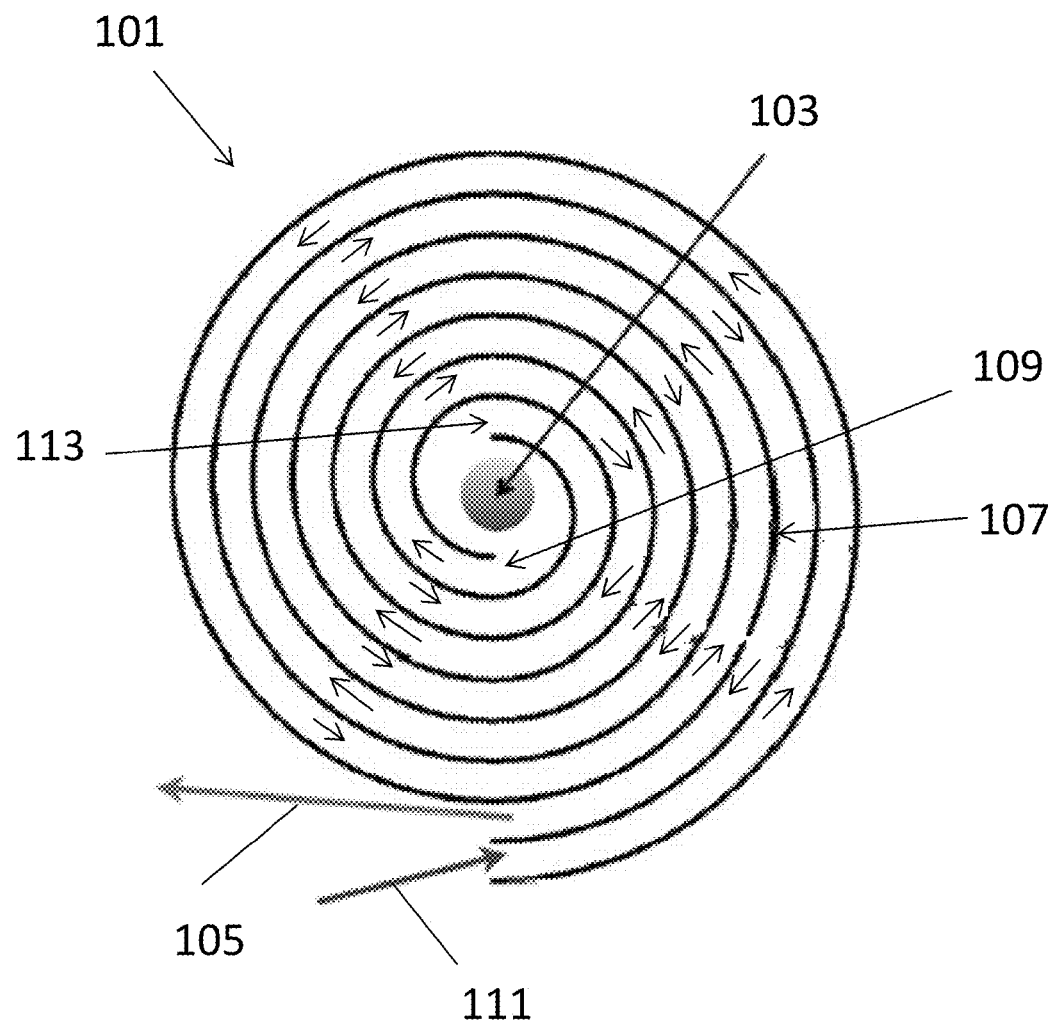
FIG. 1 is a schematic view of a fuel reformer with a spiral arrangement during a fuel reforming process, according to an embodiment of the disclosure.

FIG. 1 shows an embodiment of a fuel reformer 101 during an embodiment of a fuel reforming process. The fuel reformer 101 includes a reaction zone 103 configured for exothermic partial oxidation of fuel-rich reactants 111. The reaction zone 103 is arranged and disposed within the fuel reformer 101, for example, in the middle or substantially in the middle of the fuel reformer 101. The reaction zone 103 is defined by internal structures (not shown) and/or elements of one or more features described hereinafter. The reaction zone 103 includes any suitable features permitting operation at high temperatures and/or under-oxidizing conditions. As used herein the term "partial oxidation" and grammatical variations thereof, refers to a chemical reaction that occurs in oxygen-deficient conditions (with equivalence ration being greater than 1), such as, when a fuel-air or fuel-oxygen mixture is partially reacted to produce $H_2$ and CO. An embodiment of the reforming process using the fuel reformer 101 operates energetically self-sustained and without a catalyst by generating reformates 105 by the exothermic partial oxidation process, while heating the fuel-rich reactants 111 upstream of the reaction zone 103, for example, with a heat exchanger, that efficiently transfers heat from the reformates 105 in the reformate path 109 to the fuel-rich reactants 111 flowing in adjacent spiral windings (for example, to an adiabatic flame temperature, a super-adiabatic flame temperature, or at least to an adiabatic flame temperature or a super-adiabatic flame temperature).

The fuel reformer 101 and/or one or more components within the fuel reformer 101 are fabricated from any material capable of handling the operational conditions. Such materials include, but are not limited to, stainless steel and nickel-based superalloys.

Figure 3:
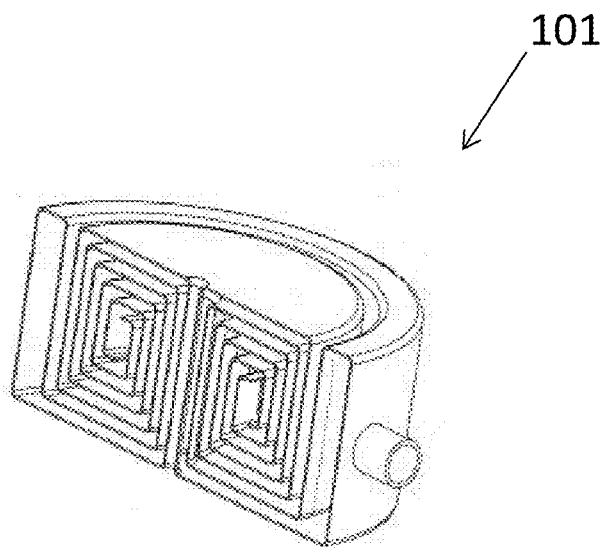
FIG. 3 is a schematic view of a fuel reformer with a toroidal arrangement, according to an embodiment of the disclosure.
Figure 4:
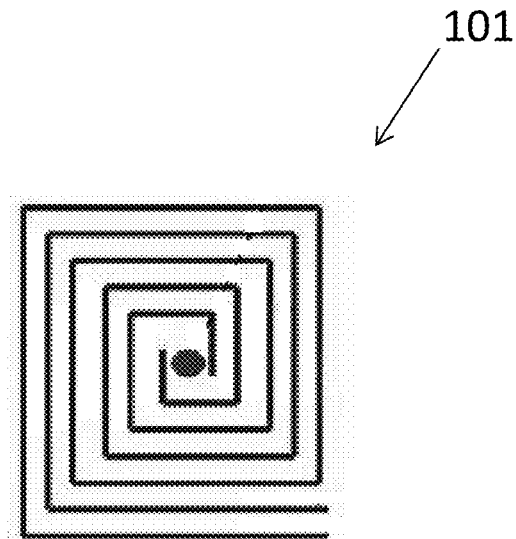
FIG. 4 is a schematic view of a fuel reformer with a square spiral arrangement, according to an embodiment of the disclosure.

A fuel path 113 and a reformate path 109 extend from the reaction zone 103, for example, in a spiraling countercurrent arrangement. In one embodiment, the merger of the fuel path 113 and the reformate path 109 define the reaction zone 103. In one embodiment, one or both of the fuel path 113 and the reformate path 109 spiral from the reaction zone 103, for example, along a spiral heat exchanger 107. The spiral nature of the spiral heat exchanger 107 includes any suitable arrangement with complete or partial overlapping of the fuel path 113 and the reformate path 109 that permits separate fluid transport. Suitable arrangements include, but are not limited to, an arrangement of two or more plates coiled to form a spiral as is shown in FIG. 1, a cuboid arrangement of one or more plates forming a square spiral (see FIG. 4), a three-dimensional toroidal arrangement (see FIG. 3), or a combination thereof. In one embodiment, the spiral heat exchanger 107 includes one or more heat transfer enhancements, for example, as occur naturally (Dean vortices) and/or through including additional inserts or other heat transfer enhancements to increase heat transfer and/or enable the reformate path 109 and/or the fuel path 113 to maintain a desired heat transfer rate.

In general, the spiral arrangement includes any suitable dimensions and/or configuration. The spiral arrangement includes any suitable number of turns, which are substantially extensions around the reaction zone 103. Suitable numbers of turns include, but are not limited to, 3 or more turns, 6 or more turns, between 3 and 10 turns, between 3 and 12 turns, between 6 and 12 turns, between 10 and 12 turns, between 3 and 16 turns, between 6 and 16 turns, between 10 and 16 turns, 6 or more turns, 10 or more turns, 12 or more turns, 16 or more turns, or any suitable combination, sub-combination, range, or sub-range therein.

The spiral arrangement includes any suitable separation for the fuel path 113 and/or the reformate path 109. In one embodiment, the fuel path 113 and/or the reformate path 109 have a thickness within one or more of the turns of between 2 mm and 3 mm, between 1 mm and 5 mm, between 1 mm and 4 mm, between 2 mm and 5 mm, 2 mm, 2.5 mm, 3 mm, or any suitable combination, sub-combination, range, or sub-range therein. In one embodiment, the fuel path 113 and/or the reformate path 109 increase in width consistent with increased pressure regions.

The spiral arrangement also includes any suitable dimensions for the axial length of the fuel path 113 and/or the reformate path 109. Suitable dimensions include, but are not limited to, between 10 mm and 100 mm, between 20 mm and 80 mm, between 30 mm and 70 mm, between 40 mm and 60 mm, between 45 mm and 55 mm, 45 mm, 50 mm, 55 mm, or any suitable combination, sub-combination, range, or sub-range therein. In one embodiment, the reaction zone 103 extends axially along the region between the fuel path 113 and the reformate path 109, which provides greater heat release to loss (through end plates) ratio and, therefore, more heat recirculation effect.

The spiral arrangement produces multiple heat transfer benefits. In one embodiment, the spiral arrangement increases a heat transfer effect, for example, through centrifugal instability that occurs within the spiral channel. Additionally or alternatively, in one embodiment, the spiral arrangement provides a larger ratio of heat exchange area to heat loss area, thereby increasing exchanger efficiency for a defined volume, in comparison to non-spiraling arrangements. In one embodiment, the configuration of the arrangement and/or the number of the turns is selected to correspond to such properties.

The reaction zone 103 generates the reformates 105 from the exothermic partial oxidation of the fuel-rich reactants 111 provided via the fuel path 113. The fuel-rich reactants 111 have any suitable composition capable of producing a greater stoichiometric amount of $H_2$ during the exothermic partial oxidation of the fuel reforming process, for example, in comparison to complete combustion processes. Additionally or alternatively, the fuel-rich reactants 111 have any suitable composition capable of producing a greater stoichiometric amount of CO during the exothermic partial oxidation of the fuel reforming process, for example, in comparison to combustion processes. Suitable compositions of the fuel-rich reactants 111 include, but are not limited to, propane-air mixtures (for example, at an equivalence ratio equal to 3), vaporized liquid fuel-air mixtures (for example, n-heptane, kerosene-based fuel, and/or Jet Propellant 8 jet fuel), pulverized solid fuel-air mixtures (for example, coal-air, and/or biomass-air mixtures), or a combination thereof.

The reformates 105 transfer heat, generated from the exothermic partial oxidation, to the fuel rich reactants 111, the fuel path 113, and/or the spiral heat exchanger 107. In one embodiment, the heat is transferred by the reformate path 109 being in contact with the fuel path 113 and/or the spiral heat exchanger 107. In a further embodiment, the transfer of the heat permits a high reaction temperature resulting a fast reaction rate and the fuel reforming process to be energetically self-sustained and/or operate without a catalyst.

According to an embodiment of the process, the fuel-rich reactants 111 and/or the fuel path 113 are at a lowest temperature (for example, ambient temperature) upon entry to the fuel reformer 101. The temperature of the fuel-rich reactants 111 and/or the fuel path 113 increase in temperature via heat recirculation along the direction of flow until reaching the reaction zone 103 and then the exothermic partial oxidation further increases the temperature to the highest temperature (for example, between 1000° C. and 1300° C., the adiabatic flame temperature for equivalence ratio equal to 3 of propane-air mixture is 808° C.) at or near the reaction zone 103. The reformates 105 travel from the reaction zone 103 through the reformate path 109. The reformate path 109 and the reformates 105 are at a highest temperature (for example, between 1000° C. and 1300° C.) at the reaction zone 103 and decrease in temperature along the direction of flow until reaching a lower temperature upon flowing from the fuel reformer 101.

Figure 2:
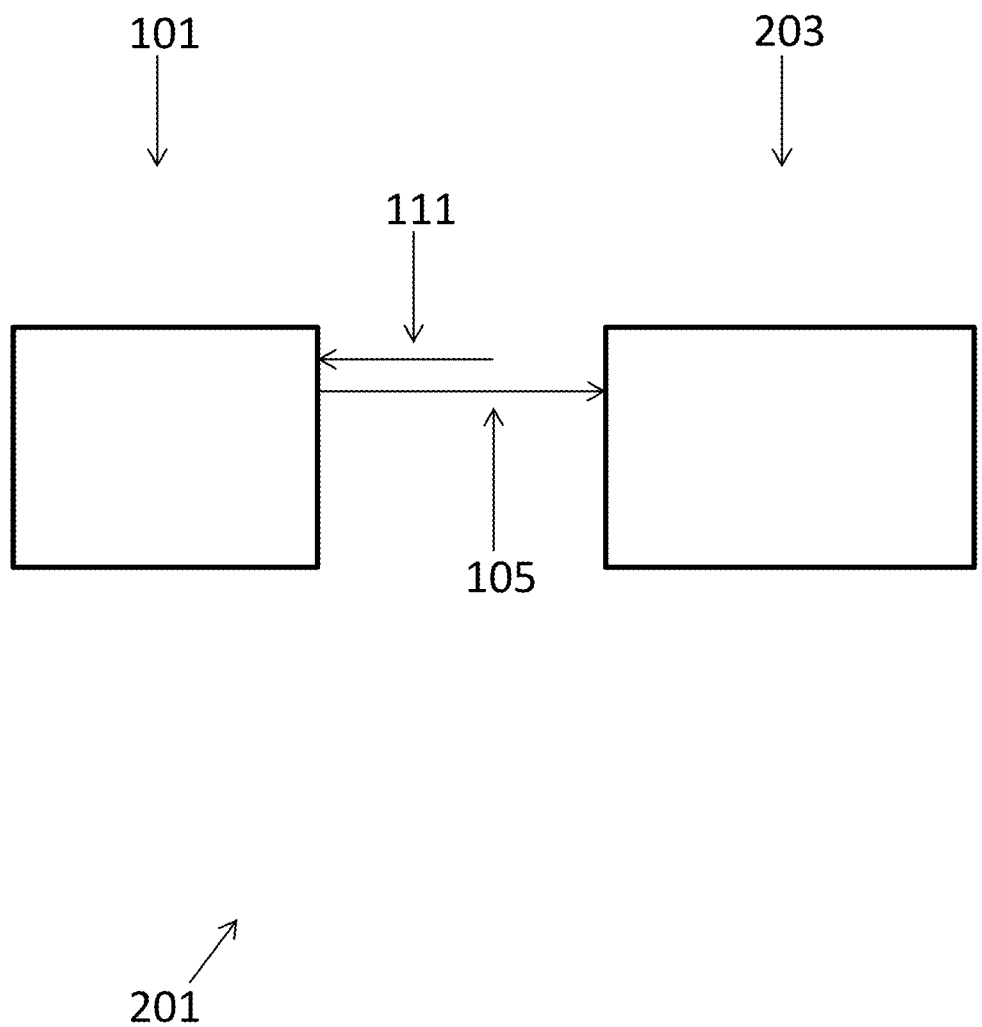
FIG. 2 is a schematic view of a system having a fuel reformer and a secondary device, according to an embodiment of the disclosure.

The composition of the reformates 105 and the arrangement of the fuel path 113 and the reformate path 109 permit the fuel reformer 101 to be used in conjunction with systems incompatible with combustors. As used herein, being "incompatible with combustors" refers to not being operable when receiving combustion products. For example, referring to FIG. 2, in one embodiment, the fuel reformer 101 is arranged within a system 201 having a component 203 or device capable of use or operation with the reformates 105. The component 203 is a fuel cell (for example, a solid oxide fuel cell, a 250 W fuel cell, a fuel cell having less than 500 W power, or any other suitable fuel cell), a hydrogen and/or syngas storage container, a hydrogen separation unit, an auxiliary power unit, a portable power generation system, a micro-combined heat and power system (m-CHP), a robotic system, another suitable apparatus, an after-treatment system in a diesel engine (for example, to reform part of diesel to syngas and regenerate lean NOx catalyst), a gasoline engine, or a combination thereof. Other devices include, but are not limited to, a water gas shift reactor having water introduced or produced, the water reacting with CO(g) in the reformate to produce additional $H_2$ by the equation $CO+H_2O \rightarrow CO_2+H_2$ and/or a Fischer-Tropsch reactor having a Fischer-Tropsch catalyst to synthesize liquid fuels. The system 201 is or includes any arrangement including the fuel reformer 101 and the component 203, such as, a power generation system, a reactor, a diesel engine, a gasoline engine, a vehicle, an independently-powered device, or a combination thereof. In one embodiment, the fuel reformer 101 is separate from other portions of the system 201 and the reformates 105 are transported to the other portions of the system 201.

The system 201 includes any suitable features for operating the fuel reformer 101 in conjunction with the reformates 105. Suitable features include, but are not limited to, a blower (not shown) and a fuel injection system (not shown). In one embodiment, additional sub-systems (for example, pre-desulfurization, water management, inert gas protection for start-up and shut-down, and/or complicated control sub-systems) are not utilized.

The fuel reformer 101 and/or the system 201 are capable of being adjusted to increase the concentration of $H_2$ and/or CO in the process, for example, achieving a mixture having a concentration of $H_2$ and CO that is at or near their thermodynamic equilibrium concentrations. Achievable molar concentrations of $H_2$ include, but are not limited to, about 8%, about 14%, about 15%, about 17%, at least 8%, at least 14%, at least 15%, at least 17%, or any suitable combination, sub-combination, range, or sub-range therein, thereby resulting in a ratio of the equilibrium concentration being about 28%, about 49%, about 54%, about 60%, at least 28%, at least 49%, at least 54%, at least 60%, or any suitable combination, sub-combination, range, or sub-range therein. Achievable molar concentrations of CO include, but are not limited to, about 15%, about 17%, about 18%, about 18.5%, at least 15%, at least 17%, at least 18%, at least 18.5%, or any suitable combination, sub-combination, range, or sub-range therein, thereby resulting in a ratio of the equilibrium concentration being about 70%, about 80%, about 85%, about 87%, at least 70%, at least 80%, at least 85%, at least 87%, or any suitable combination, sub-combination, range, or sub-range therein.

To achieve desired molar concentrations of $H_2$ and CO, for example, in one embodiment, a flow is adjusted. Suitable flow velocities include, but are not limited to, 50 cm/s, 100 cm/s, 150 cm/s, 200 cm/s, at least 50 cm/s, at least 100 cm/s, at least 150 cm/s, at least 200 cm/s, or any suitable combination, sub-combination, range, or sub-range therein. Suitable flow volumes include, but are not limited to, 62.5 cc/s, 125 cc/s, 187.5 cc/s, 250 cc/s, at least 62.5 cc/s, at least 125 cc/s, at least 187.5 cc/s, at least 250 cc/s, or any suitable combination, sub-combination, range, or sub-range therein.

Flow conditions correlate to a Reynolds number (defined by the channel width, input flow velocity, and viscosity at room temperature), which, in one embodiment, is a ratio of inertial forces to viscous forces and corresponding to the number of transfer units (NTU) of the spiral heat exchanger. Suitable Reynolds numbers include, but are not limited to, 78.7, 157.3, 200, 236.0, 300, 314.7, 400, 800, 1600, at least 78.7, at least 157.3, at least 200, at least 236.0, at least 300, at least 314.7, at least 400, at least 800, at least 1600, or any suitable combination, sub-combination, range, or sub-range therein. Suitable input power conditions for the process include, but are not limited to, 500 W, 575.5 W, 1000 W, 1151.5 W, 1727.2 W, 2000 W, 2303 W, 2500 W, up to 575.5 W, up to 1151.5 W, up to 1727.2 W, up to 2303 W, up to 2500 W, more than 2500 W, or any suitable combination, sub-combination, range, or sub-range therein.

EXAMPLES

In a first example, the fuel reformer 101 receives the fuel-rich reactants 111. The fuel-rich reactants 111 include a propane-air mixture at an equivalence ratio equal to 3. The fuel reformer 101 includes 3.5-turn spiraling arrangements of the fuel path 113 and the reformate path 109, with the thickness of the fuel path 113 and the reformate path 109 being 2.5 mm and the dimensions of the axial length of the fuel path 113 and the reformate path 109 being 50 mm. The fuel-rich reactants 111 are introduced to the fuel reformer 101 with conditions of a flow rate of 78.7 ratio of inertial forces to viscous forces (Reynolds number), 50 cm/s flow velocity, 62.5 cc/s flow volume, and 575.7 W input power. Under these conditions, the reformates 105 have a mole fraction of about 8% $H_2$ and a mole fraction of about 15% CO. In comparison to the equilibrium states of $H_2$ (28.4%) and CO (21.3%), in this example, the $H_2$ is at about 28% of the equilibrium concentration (8%/28.4%=28.2%) and the CO is at about 70% of the equilibrium concentration (15%/21.3%=70.4%) of CO compared to their equilibrium states.

In a second example, the fuel reformer 101 receives the fuel-rich reactants 111. The fuel-rich reactants 111 include the propane-air mixture at an equivalence ratio equal to 3. The fuel reformer 101 includes 3.5-turn spiraling arrangements of the fuel path 113 and the reformate path 109, with the thickness of the fuel path 113 and the reformate path 109 being 2.5 mm and the dimensions of the axial length of the fuel path 113 and the reformate path 109 being 50 mm. The fuel-rich reactants 111 are introduced to the fuel reformer 101 with conditions of a flow rate of 157.3 ratio of inertial forces to viscous forces (Reynolds number), 100 cm/s flow velocity, 125 cc/s flow volume, and 1151.5 W input power. Under these conditions, the reformates 105 have a mole fraction of about 14% $H_2$ and a mole fraction of about 17% CO, showing that the concentration of $H_2$ and CO increases with the Reynolds number, which is believed to be due to increased heat release to loss ratio and more heat recirculation. In comparison to the equilibrium states of $H_2$ (28.4%) and CO (21.3%), in this example, the $H_2$ is at about 49% of the equilibrium concentration (14%/28.4%=49.3%) and the CO is at about 80% of the equilibrium concentration (17%/21.3%=79.8%) of CO compared to their equilibrium states.

In a third example, the fuel reformer 101 receives the fuel-rich reactants 111. The fuel-rich reactants 111 include the propane-air mixture at an equivalence ratio equal to 3. The fuel reformer 101 includes 3.5-turn spiraling arrangements of the fuel path 113 and the reformate path 109, with the thickness of the fuel path 113 and the reformate path 109 being 2.5 mm and the dimensions of the axial length of the fuel path 113 and the reformate path 109 being 50 mm. The fuel-rich reactants 111 are introduced to the fuel reformer 101 with conditions of a flow rate of 236 ratio of inertial forces to viscous forces (Reynolds number), 150 cm/s flow velocity, 187.5 cc/s flow volume, and 1727.2 W input power. Under these conditions, the reformates 105 have a mole fraction of about 15% $H_2$ and a mole fraction of about 18% CO, showing that the concentration of $H_2$ and CO increases with the Reynolds number, which is believed to be due to increased heat release to loss ratio and more heat recirculation. In comparison to the equilibrium states of $H_2$ (28.4%) and CO (21.3%), in this example, the $H_2$ is at about 54% of the equilibrium concentration (15%/28.4%=53.5%) and the CO is at about 85% of the equilibrium concentration (18%/21.3%=84.5%) of CO compared to their equilibrium states.

In a fourth example, the fuel reformer 101 receives the fuel-rich reactants 111. The fuel-rich reactants 111 include the propane-air mixture at an equivalence ratio equal to 3. The fuel reformer 101 includes 3.5-turn spiraling arrangements of the fuel path 113 and the reformate path 109, with the thickness of the fuel path 113 and the reformate path 109 being 2.5 mm and the dimensions of the axial length of the fuel path 113 and the reformate path 109 being 50 mm. The fuel-rich reactants 111 are introduced to the fuel reformer 101 with conditions of a flow rate of 314.7 ratio of inertial forces to viscous forces (Reynolds number), 200 cm/s flow velocity, 250 cc/s flow volume, and 2303 W input power. Under these conditions, the reformates 105 have a mole fraction of about 17% $H_2$ and a mole fraction of about 18.5% CO, showing that the concentration of $H_2$ and CO increases with the Reynolds number, which is believed to be due to increased heat release to loss ratio and more heat recirculation. In comparison to the equilibrium states of $H_2$ (28.4%) and CO (21.3%), in this example, the $H_2$ is at about 60% of the equilibrium concentration (17%/28.4%=59.9%) and the CO is at about 87% of the equilibrium concentration (18.5%/21.3%=86.9%) of CO compared to their equilibrium states.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fuel reforming process, comprising:
   providing a fuel reformer, the fuel reformer comprising:
      a reaction zone configured for exothermic partial oxidation to generate reformates; and
      a spiral heat exchanger extending from the reaction zone, the heat exchanger configured to expel the reformates through a spiral reformate path and receive fuel-rich reactants through a spiral countercurrent fuel path, the spiral reformate path being adjacent to the spiral countercurrent fuel path;
   generating the reformates by the exothermic partial oxidation of the fuel-rich reactants within the reaction zone;
   heating the fuel-rich reactants with the heat exchanger by heat from the reformates in the reformate path;
   wherein the process is energetically self-sustained and operates without a catalyst.

2. The process of claim 1, wherein the spiral heat exchanger comprises a heat transfer enhancements configured to form Dean vortices capable of increasing heat transfer.

3. The process of claim 1, wherein the reformate path and the fuel path spiral from the reaction zone.

4. The process of claim 3, wherein the reformate path and the fuel path spiral each form at least 3 turns.

5. The process of claim 1, comprising introducing the fuel-rich reactants at a flow velocity of at least 200 cm/s.

6. The process of claim 1, comprising introducing the fuel-rich reactants at a flow volume of at least 250 cc/s.

7. The process of claim 1, comprising introducing the fuel-rich reactants with a Reynolds number of at least 314.7.

8. The process of claim 1, wherein $H_2$ in the reformate is at a molar concentration of at least 17%.

9. The process of claim 1, wherein CO in the reformate is at a molar concentration of at least 18.5%.

10. The process of claim 1, wherein $H_2$ in the reformate is at a molar ratio of at least 60% compared to the equilibrium concentration.

11. The process of claim 1, wherein CO in the reformate is at a molar ratio of at least 87% compared to the equilibrium concentration.

12. The process of claim 1, wherein the reaction temperature exceeds the adiabatic flame temperature of the fuel-rich reactants.

13. The process of claim 1, wherein the fuel-rich reactants include fluid selected from the group consisting of a methane-air mixture, a propane-air mixture, an n-heptane-air vaporized liquid-fuel mixture, a kerosene-based fuel-air mixture, a Jet Propellant 8 jet fuel-air mixture, a pulverized coal-air mixture, a biomass-air mixture, and combinations thereof.

14. The process of claim 1, comprising operating the fuel reformer in a system incompatible with combustion products.

15. The process of claim 14, wherein the operating of the fuel system is as a hydrogen storage container, an auxiliary power unit, a portable power system, a micro-combined heat and power system, a robotic system, an after-treatment system in a diesel engine, a hydrogen-enhancement combustion engine, or a combination thereof.

16. The process of claim 14, wherein the system is a power generation system, a reactor, a diesel engine, gasoline engine, an independently-powered device, or a combination thereof.

17. The process of claim 1, comprising operating the fuel reformer in conjunction with a device selected from the group consisting of:
- a water gas shift reactor having water introduced or produced, the water reacting with CO(g) in the reformate to produce additional $H_2$ by the equation $CO+H_2O \rightarrow CO_2+H_2$;
- a Fischer-Tropsch reactor having a Fischer-Tropsch catalyst to synthesize liquid fuels; and
- a fuel cell.

* * * * *